(12) United States Patent
Reid

(10) Patent No.: US 8,789,342 B2
(45) Date of Patent: Jul. 29, 2014

(54) PIT LID WITH A PRINTABLE LAYER

(75) Inventor: Ashley George Reid, Thomastown (AU)

(73) Assignee: Terra Firma Industries Pty Ltd., Thomastown, Victoria (AU)

( * ) Notice: Subject to any disclaimer, the term of this patent is extended or adjusted under 35 U.S.C. 154(b) by 7 days.

(21) Appl. No.: 13/814,101

(22) PCT Filed: Aug. 2, 2011

(86) PCT No.: PCT/AU2011/000967
§ 371 (c)(1),
(2), (4) Date: May 15, 2013

(87) PCT Pub. No.: WO2012/016275
PCT Pub. Date: Feb. 9, 2012

(65) Prior Publication Data
US 2013/0305613 A1    Nov. 21, 2013

(30) Foreign Application Priority Data

Aug. 2, 2010   (AU) ................................ 2010903447

(51) Int. Cl.
*E04C 2/54*   (2006.01)
(52) U.S. Cl.
USPC .......................................... 52/783.1; 52/309.1
(58) Field of Classification Search
CPC ....................................................... E02D 29/14

USPC .................. 52/309.1, 783.1; 49/504; 156/277
See application file for complete search history.

(56) References Cited

U.S. PATENT DOCUMENTS

| 5,842,811 | A  | * | 12/1998 | Johnson ........................... 404/25 |
| 6,250,001 | B1 | * | 6/2001  | Gillespie .......................... 40/600 |
| 6,319,592 | B1 | * | 11/2001 | Ney et al. ................... 428/195.1 |
| 2006/0210755 | A1 |   | 9/2006  | Blazek |

FOREIGN PATENT DOCUMENTS

FR     2933801 A1    1/2010

OTHER PUBLICATIONS

International Search Report dated Oct. 31, 2011 for PCT application No. PCT/AU2011/000967.

* cited by examiner

*Primary Examiner* — Mark Wendell
(74) *Attorney, Agent, or Firm* — Ohlandt, Greeley, Ruggiero & Perle, LLP

(57) ABSTRACT

A pit lid comprising a frame defining the perimeter of the pit lid, and a web bonded thereto, said web including a substantially planar core to each face of which is bonded a plurality of layers of reinforcing material, a layer of printable permeable tissue bonded to the outer face of the uppermost layer of reinforcing material, and a non-skid coating forming the topmost layer of the web of the pit lid, and a method of constructing said pit lid.

13 Claims, No Drawings

PIT LID WITH A PRINTABLE LAYER

FIELD OF THE INVENTION

The present invention relates to pit lids and other utility pit or in-ground pit covers and in particular to the enabling or facilitating of printing of graphic designs, logos or informational material onto pit lids or similar covers.

BACKGROUND OF THE INVENTION

Pit lids or similar covers are used to cover in-ground pits. They often need to embody information as to what the contents of the pit relate to, warning signs, identification of origin or identification of relevant organisations, or contact details for emergency situations. Additionally, it may be desirable to add some aesthetic appeal to what is otherwise a purely utilitarian object.

Improving the aesthetic appeal of a pit lid may increase the efficacy of conveying information embodied in the pit lid. At present, logos, messages or other information, including product information, are applied to pit lids by imprinting the logo or message onto the lid or by spray painting a stencil onto the lid. Stenciling involves spraying the covers overlaid with one or more stencils with paint. This process is limited to basic mono-colour images. The paint has a short lifespan before wearing off. The process is simple but requires high labour inputs. Imprinting the pit lids can be effected either by using a mould, which is costly for short production runs, or by placing stickers under the final layer of non-skid coating and then removing those stickers by hand after the application of the non-skid resin coating. While this is a practical way to deal with short production runs, it is very labour intensive and the consumables cost of the stickers is high. Resulting designs are limited to simple graphics or wording.

Overlays of coloured resins have also been used to provide simple multicoloured pit lids. These methods are costly in terms of raw materials and they do not allow any complexity in the graphic designs. Overlaying coloured resins is used when the non-skid resin layer is applied. This in effect involves painting different coloured resins onto the upper surface of the pit lid. While this method can result in a simple multi-coloured appearance for the pit lid it does not provide for complex graphics and the appearance is somewhat crude, which detracts from the efficacy of the attempted communication.

It is an object of the present invention to ameliorate some or all of the foregoing problems.

SUMMARY OF THE INVENTION

It has been found that the incorporation of a layer of printable, permeable tissue in the uppermost layer of fibreglass permits the transfer of a complex design onto the upper surface which design can remain visible through a non-skid resin layer as typically applied over the upper surface.

Thus according to one aspect of the present invention there is provided a pit lid, comprising a frame defining the perimeter of the pit lid, and a web bonded thereto, said web including a substantially planar core to each face of which is bonded a plurality of layers of reinforcing material, a layer of printable permeable tissue bonded to the outer face of the uppermost layer of reinforcing material, and a non-skid coating forming the topmost layer of the web of the pit lid.

An example of a preferred printable permeable tissue is a polyester surface veil or tissue such as sold in Australia under the trade name Nexus. Other printable permeable tissues, such as permeable fibreglass tissues or sheeting, and even permeable papers, can be used in the present invention.

The resulting surface formed by the printable permeable tissue prior to the application of the non-skid coating can accept printing of words and/or logos and/or devices thereon. This allows product information, service information, community messages, safety messages or advertising to be incorporated into pit lids. The layer of printable permeable tissue may have information printed onto it prior to the application of the non-skid coating or may be left blank. The use of UV stabilised inks in the printing process can slow or prevent fading of the resultant printing on the printed tissue.

The non-skid resin layer or coating is formulated to remain clear and may be prepared by using a moulding process or by incorporating a soluble granular substance (such as sugar) in the upper face of the coating to achieve a non-skid surface. This is a departure from the use of sand to create a rough non-skid surface.

The non-skid coating, preferably incorporating a setting resin, being clear, permits the printed information to be seen. It also bonds the tissue with the uppermost fibreglass layer of the pit lid.

The present invention also provides, in another aspect, a method of constructing pit lids bearing printed matter, wherein, as par of the process of construction, a plurality of layers of reinforcing material, preferably composed of fibreglass, are adhered to both sides of a planar core (typically constructed of engineered plywood) using a setting resin, a layer of printable permeable tissue is then laid on the uppermost layer of reinforcing material and adhered to said uppermost layer of reinforcing material using a setting resin, either printed matter, being words, logos or devices or combinations of the foregoing, having been printed on the topmost surface of the printable permeable tissue, or the topmost surface of the printable permeable tissue having been left blank, and a non-skid coating, containing a setting resin (preferably clear) is then applied to the printed topmost surface of the printable permeable tissue. Alternatively, the printable permeable tissue may be printed after it has been adhered to the said uppermost layer of reinforcing material.

The upper surface resin-based coating may be moulded to provide a non-skid surface. Alternatively, a water soluble solid material may be incorporated into the resin-based coating or applied to the upper surface of the coating and later removed by dissolution with water or an aqueous-based mixture.

The resulting web may be bonded to the frame defining the pit lid either before or after the non-skid coating is formed.

DESCRIPTION OF PREFERRED EMBODIMENT

In order to better describe the present invention, a preferred embodiment is hereinafter described.

A pit lid according to the present invention is constructed by first cutting a sheet of engineered plywood to the desired dimensions for a pit lid, and adhering a plurality of layers of fibreglass material on each face of the engineered plywood. A sheet of printable permeable polyester surface tissue, preferably that sold under the trade name Nexus, is then placed on what is to be the upper side of the pit lid and may be adhered to with a resin, preferably an isopthtalic polyester resin. Printing of printed matter, logos, designs or other features can then be applied to the permeable tissue (or can be applied prior to adhering it to what is to be the upper side of the pit lid). A non-skid coating, preferably formed from a clear setting resin to which has been added a water soluble solid granular material is then applied to the upper surface of the printed permeable tissue and allowed to set. The application of water to the non-skid coating allows for removal of the water soluble solid granular material to thereby assist in forming the non-skid coating. The web thereby formed is then adhered or bonded to a steel frame forming the perimeter of the pit lid.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form or suggestion that the prior art forms part of the common general knowledge in Australia or elsewhere.

Finally, it is to be understood that the foregoing description refers merely to preferred embodiments of the invention, and that variations and modifications will be possible thereto without departing from the spirit and scope of the invention, the ambit of which is to be determined from the following claims.

The invention claimed is:

1. A pit lid comprising a frame defining the perimeter of the pit lid, a web bonded thereto, said web including a substantially planar core to each face of which is bonded a plurality of layers of reinforcing material, a layer of printable permeable tissue bonded to the outer face of the uppermost layer of reinforcing material, and a non-skid coating forming the topmost layer of the web of the pit lid.

2. A pit lid as claimed in claim 1, wherein the printed permeable tissue is selected from the group consisting of polyester fabrics, and paper.

3. A pit lid as claimed in claim 2, wherein said non-skid coating is clear or transparent.

4. A pit lid as claimed in claim 3, wherein said non-skid coating moulded from a setting resin to form a non-skid surface prior to setting of the setting resin.

5. A pit lid as claimed in claim 3, wherein said non-skid coating is formed from a mixture of a setting resin and a soluble granular substance.

6. A pit lid as claimed in claim 5, wherein said soluble granular substance is a water soluble granular sugar.

7. A pit lid as claimed in claim 1, wherein said non-skid coating is clear or transparent.

8. A pit lid as claimed in claim 7, wherein said non-skid coating moulded from a setting resin to form a non-skid surface prior to setting of the setting resin.

9. A pit lid as claimed in claim 7, wherein said non-skid coating is formed from a mixture of a setting resin and a soluble granular substance.

10. A pit lid as claimed in claim 9, wherein said soluble granular substance is a water soluble granular sugar.

11. A method of constructing pit lids bearing printed matter, wherein, as part of the process of construction, a plurality of layers of reinforcing material, composed of fibreglass, are adhered to both sides of a planar core using a setting resin, a layer of printable permeable tissue, either bearing printing or blank, is then laid on the uppermost layer of reinforcing material and adhered to said uppermost layer of reinforcing material using a setting resin, printed matter, being words, logos or devices or combinations of the foregoing, being printed on the topmost surface of the adhered printable permeable tissue prior to or after adhesion of a non-skid coating, containing a clear setting resin thereafter is applied to the topmost surface of the printable permeable tissue.

12. The method as claimed in claim 11, wherein said non-skid coating is formed either by moulding said setting resin prior to it setting, or by mixing a soluble granular material with the setting resin and applying the resulting mixture to the topmost surface of the printable permeable tissue, and subsequently removing exposed soluble granular material by dissolution with a solvent.

13. A method as claimed in claim 12, wherein said soluble granular material is a water soluble granular sugar.

* * * * *